United States Patent [19]
Bereza et al.

[11] 3,909,500
[45] Sept. 30, 1975

[54] ELECTRICALLY SHIELDED CABLE SEAL ASSEMBLY AND PENETRATION COMBINATION

[75] Inventors: Albert Bereza; Renzo L. Korner; Milton W. Franke, all of Horseheads, N.Y.

[73] Assignee: Westinghouse Electric Corporation, Pittsburgh, Pa.

[22] Filed: May 30, 1974

[21] Appl. No.: 474,552

[52] U.S. Cl............... 174/11 R; 174/88 C; 174/151
[51] Int. Cl....................... G21c 13/02; H01b 17/26
[58] Field of Search......... 174/11 R, 18, 22 R, 22 C, 174/23 R, 70 S, 88 C, 151, 152 R

[56] References Cited
UNITED STATES PATENTS
3,520,989  7/1970  Funk et al............................ 174/151
3,781,453  12/1973  Funk et al.......................... 174/11 R

*Primary Examiner*—Laramie E. Askin
*Attorney, Agent, or Firm*—W. G. Sutcliff

[57] ABSTRACT

A seal assembly for bringing shielding cables through an electrical penetration. The shielding wire of the cable of two ends of shielded cable is connected by a flexible, foraminous, conductive shielding means which permits passage of a resinous sealant. The resinous sealant hardens in situ about the central signal cable forming a seal about and along the signal cable and the shielding means. A leak monitoring chamber is maintained by spacing apart two such resinous sealant members.

8 Claims, 4 Drawing Figures

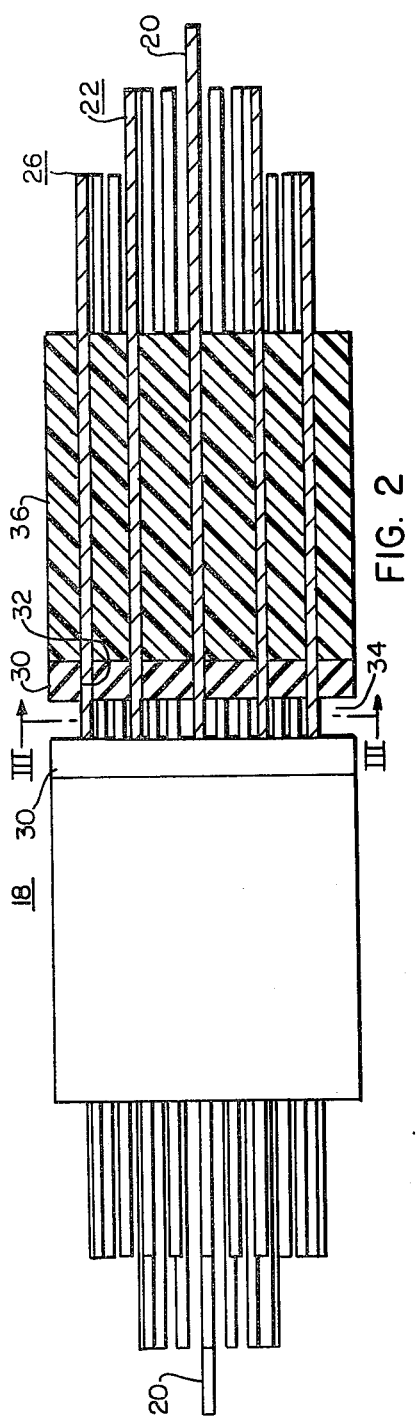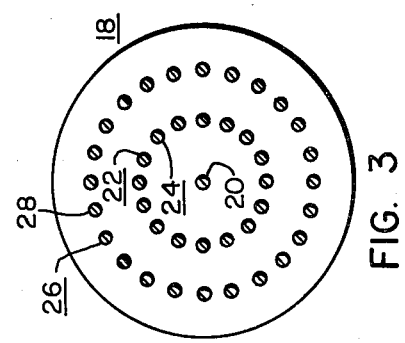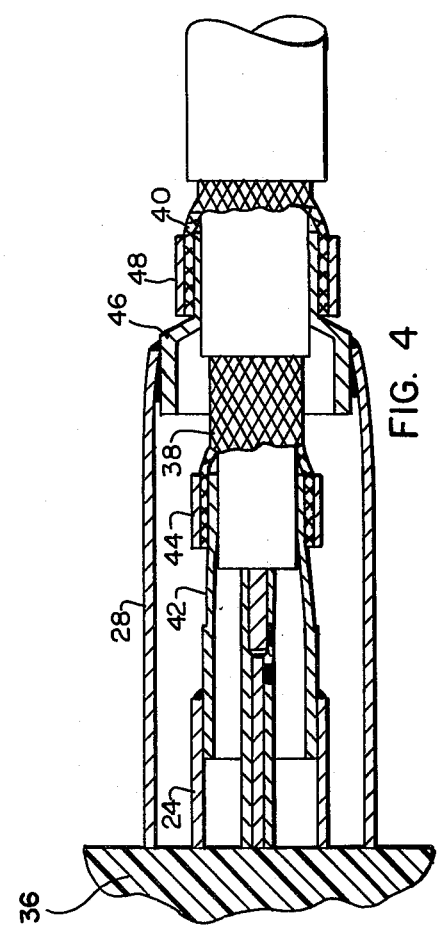

ELECTRICALLY SHIELDED CABLE SEAL ASSEMBLY AND PENETRATION COMBINATION

BACKGROUND OF THE INVENTION

1. Field of the Invention

The present invention relates to providing a seal assembly for shielded cable having a single or plural concentric shields. The seal assembly is more particularly designed for use with such shielded cable when used in an electrical penetration assembly for a nuclear containment member.

2. Description of the Prior Art

A common problem in the nuclear components field is how to effectively seal coaxial and triaxial instrumentation cables through the electrical penetration which is provided in the containment member. Such instrumentation cables present a special problem because of the need to maintain the characteristic electrical impedance of the cable. An impedance change introduced by the seal assembly would interfere with electrical signal being carried thereby, which, for example, may be a very low level signal such as from a neutron detector.

It has been the practice to form a glass seal between the central signal cable and conductive annular shielding extensions, with a glass seal provided about the shielding and an outer concentric sealing member. Such glass seals are relatively fragile and can be damaged at the construction site when the penetration is being fitted in place.

A recent advance in penetration design is described in copending application Ser. No. 432,375, filed Jan. 10, 1974, and owned by the assignee of the present invention. In that penetration design a modular concept is utilized, wherein plural conductors are first sealed within a cylindrical module which is then sealed in place. The individual conductors are sealed within the module by an in situ hardened resinous sealant, which encompasses the conductor forming a seal about and along the conductor. In bringing the glass sealed coaxial and triaxial instrumentation cable through such penetration assemblies, it was discovered that when the resinous sealant was potted about the glass coaxial seal assembly in sealing the assembly in the module, the glass seal fractured as a result of the compressive sealing force exerted by the hardening resinous sealant.

SUMMARY OF THE INVENTION

An electrically shielded cable seal assembly for bringing a shielded cable through an electrical penetration assembly. An inboard and outboard section of shielded cable are electrically connected through and sealed by the seal assembly. The centralized signal cable extends longitudinally through the seal assembly and continues as the signal cable of the inboard and outboard cable sections. A flexible, foraminous, conductive shielding means is connected to the cable shields of the inboard and outboard cables. This shielding means permits ready passage of the resinous sealant through the shielding means and is flexible so that as the resinous element compresses as it hardens, the seal is effectively maintained. The shielding means is disposed radially about and spaced from the centralized signal cable, and extends longitudinally through the seal assembly. Two spaced apart resinous sealant members formed of in situ hardened resinous sealant are disposed about the signal cable and fill the space between the signal cable and the shielding means, and encompass the shielding means. A leak monitoring spacing is maintained between the spaced apart sealant members, with the signal cable and the spaced apart shielding means extending through the leak monitoring spacing. The resinous sealant members form a seal about and along the signal cable and the shielding means.

A plurality of similar concentric shielding means can be provided for triaxial cable. The spacing between the central signal cable and the shielding means, and the dielectric constant of the resinous sealant are selected so that the electrical impedance of the seal assembly matches the electrical impedance of the shielded cable.

BRIEF DESCRIPTION OF THE DRAWINGS

FIG. 2 is an enlarged view partly in section of the seal assembly for a single shielded cable within the module of FIG. 1.

FIG. 3 is a view along line III—III of FIG. 2 which illustrates the relationship of the shielding means to the signal cable in the seal assembly of the preferred embodiment.

FIG. 4 is an enlarged sectional view showing how the shielding means is connected to the inboard and outboard shielded cable outside the module.

DESCRIPTION OF THE PREFERRED EMBODIMENT

Figure 1:
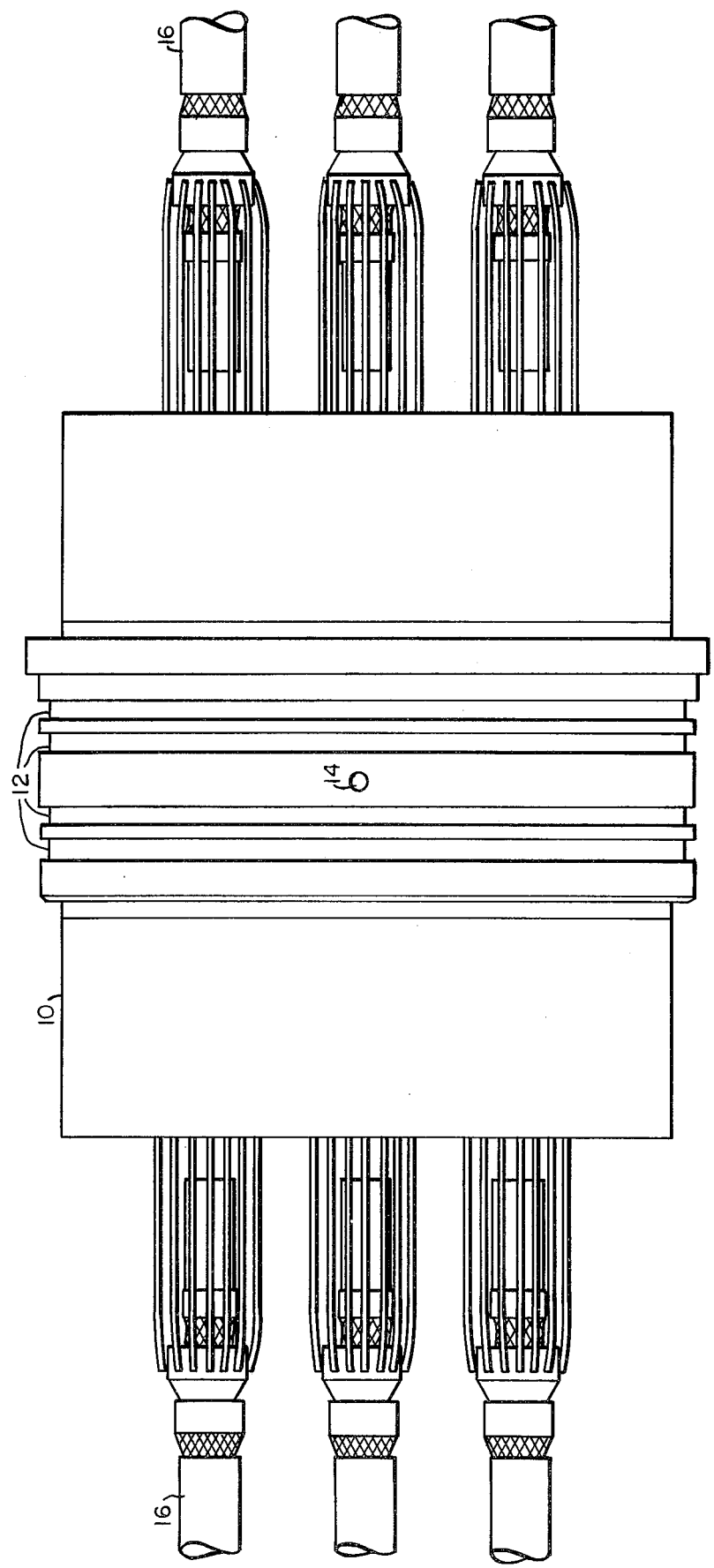
FIG. 1 is a side elevational view of a penetration module with a plurality of shielded cables extending therethrough.

The present invention can be best understood by reference to the preferred embodiment seen in the drawings.

In FIG. 1, a generally tubular penetration module 10 is seen. The module 10 is typically stainless steel and a plurality of O-ring seal grooves 12 are provided about the central portion thereof to permit ready sealing mounting of the module within a penetration flange, not shown. An aperture 14 is provided through the module 10 wall and communicates with a central leak monitoring chamber provided therein which communicates with the leak monitoring spacing provided in the cable seal assembly as will be explained.

A plurality of triaxial shielding cables 16 extend from either side of the module 10, one side being the inboard side, the other the outboard side of the nuclear penetration.

The seal assembly 18 for a single shield cable 16 is seen in great detail in FIG. 2. This seal assembly 18, not seen in FIG. 1, is potted in place within the central portion of the module 10. The seal assembly 18 comprises the central signal cable 20, which for a 75 ohm impedance triaxial cable is a number 18 AWG gauge copper wire. A flexible, foraminous, conductive first shielding means 22 is radially spaced about the central signal cable 20. The shielding means 22 must be foraminous to permit ready passage of the resinous sealant, and flexible so that as the resin compressively hardens in place, the seal is maintained. In the preferred embodiment the first shielding means comprises sixteen copper wires 24 of number 18 AWG gauge equispaced from each other in a circular configuration about the central signal cable, which circle has a diameter of about 0.375 inch. These conductive wires extend longitudinally through the seal assembly and are electrically connected at either end to the first shield of the inboard and outboard triaxial cable. For a seal assembly for coaxial cable, only the first shielding means would be utilized. For the triaxial cable embodiment, a second shielding means 26 is disposed concentrically about and spaced from the first shielding means 22. The second shielding means 26 is flexible, foraminous and conductive as is the first shielding means. In this preferred embodiment, the second shielding means 26 comprises twenty-four equispaced copper wires 28 of number 18 AWG gauge wire. The wires 28 extend longitudinally through the seal assembly and are connected at either end to the outer shield of the inboard and outboard triaxial cables. The second shielding means wires 28 are disposed in a circular configuration about the central signal cable, with the circle having a diameter of about 0.562 inch.

A pair of thin insulating disks 30 has a plurality of aligned apertures 32 provided through each to pass the signal cable and the shielding conductors therethrough. The insulating disks are spaced apart to provide a central leak monitoring chamber 34 through which the conductors pass. This permits constant monitoring of whether any leakage occurs along any of the conductors. This leak monitoring chamber 34 communicates with aperture 14 in module 10 for this purpose. The insulating disks are formed of a high temperature and radiation resistant material, typically polycarbonate.

The resinous sealant members 36 are disposed abutting the outer surface of each of the insulating disks 30. The resinous sealant members 36 are formed by in situ hardening of the insulating resinous material about the central signal cable and the shielding means. The resin is selected to form a hermetic seal along each of the conductors. The seal is temperature and radiation resistant. The resin used must have a high electric resistance and a dielectric constant selected to ensure that the electrical impedance of the seal assembly matches the impedance of the coaxial or triaxial cable used. The dielectric constant of a typical resinous material found useful is about 4.7. The preferred resinous material is "Epon Resin 815," a trademarked Shell Oil Company material, which is a epichlorohydrin-bisphenol A-type epoxy resin material, with a viscosity of 5–7 poises at 25°C, and an epoxide equivalent of 175–195. This epoxy resin material is admixed about 5 parts resin with one part curing agent or catalyst, such as "Epon Curing Agent Z," a Shell Oil Company trademarked material, which is a liquid aromatic amine type curing agent. The mixture is flowable and can be readily poured to fill the spaces between the conductors. The insulating disk serves as a mold wall and a sleeve, not shown, can be placed about the second shielding means to permit in situ hardening of the resinous sealant about the conductors to form the sealant members 36.

The seal assembly 18 can then be potted in place within the module using similar resinous sealants. The leak monitoring chamber 34 is aligned with a leak monitoring chamber within the module. It is also possible to form the sealant member 36 about each seal assembly 18 within the module. In some cases only one cable will be brought through the module so that the module wall would serve as the forming chamber into which the resinous sealant is admitted for in situ hardening.

The resinous material should be selected with a dielectric constant such that the electrical impedance of the seal assembly matches the characteristic electrical impedance of the cable. The first and second shielding means spacing and the air gaps between them and the signal cable are also such that this impedance match is maintained. The shielding means cannot be a continuous metal member since the resinous sealant must be introduced through the shielding means, and must sealingly encompass the shielding means forming a seal along its length. The shielding means flexibility permits a good seal to be formed under the compressive force applied by the hardening resinous sealant. Thus, a conductive mesh shielding means may be substituted for the spaced wires taught in the preferred embodiment, with the mesh openings being large enough to permit the resinous sealant to flow through.

The first and second shielding means wires 24, 28 are respectively connected to the inner shield 38 and outer shield 40 of the triaxial cables 16. An annular conductive ring 42 is electrically connected to the inner shield 38 to facilitate electrical connection of the wires 24, with the wires 24 being soldered to the ring 42 for electrical connection. An annular crimping means 44 can be provided about the annular ring 42 to securely engage the ring 42 to the inner shield 38. In like manner, a second annular conductive ring 46 is provided within the outer shield 40, with the second annular crimping means 48 provided thereabout to secure the ring 46 to outer shield 40. The wires 28 of second shielding means 26 are then electrically connected to ring 46 as by soldering.

We claim:

1. An electrically shielded cable seal assembly for connecting two sections of a shielded cable comprising;
    a longitudinally extending signal cable;
    a flexible, foraminous, conductive shielding means through which resinous sealant may be readily passed, radially disposed about and spaced from the signal cable;
    two spaced apart electrically insulating resinous sealant members formed of in situ hardened resinous sealant disposed about the signal cable and filling the spacing between the signal cable and the shielding means, and encompassing the shielding means, with a leak monitoring spacing maintained between the spaced apart sealant members which each form a seal about and along the signal cable and the shielding means, said signal cable and shielding means extending through said sealant members and continuing as the signal cable and shielding means on either side thereof.

2. The seal assembly specified in claim 1, wherein a second conductive shielding means is provided spaced concentrically about the flexible, foraminous conductive shielding means, and the second conductive shielding means is also a flexible, foraminous conductive means and the resinous sealant members extend radially outwardly and encompass the second shielding means.

3. The seal assembly specified in claim 1, in combination with matched input and output shielded cables electrically connected to the seal assembly wherein the spacing between the signal cable and the shielding means, and the dielectric constant of the resinous sealant are selected so that the electrical impedance of the seal assembly matches the electrical impedance of the shielded cables.

4. The seal assembly specified in claim 1, wherein a pair of spaced apart insulating disks each having a plurality of matching apertures passing the signal cable and the shielding means are spaced apart to define the leak monitoring chamber with the resinous sealant members abutting the sides of the spaced insulating disks remote from the leak monitoring chamber.

5. The seal assembly specified in claim 1, wherein the shielding means comprises a plurality of spaced apart conductive wires radially equispaced from and about the signal cable.

6. The seal assembly specified in claim 5, wherein a second flexible, foraminous, conductive shielding means is provided about the spaced apart radially equispaced conductive wires, which second shielding means comprises a plurality of spaced apart radially equispaced conductive wires, and wherein the resinous sealant members extend outwardly and encompass the second shielding means.

7. An electrical penetration assembly in which electrically shielded cable is sealingly brought through a high temperature and radiation resistant member, wherein an inboard shielded cable including a central conductor and an outer conductive shield and an outboard shielded cable including a central conductor and an outer conductive shield extend on opposite sides of a seal assembly portion of the penetration assembly, the improvement wherein the seal assembly portion comprises
- a signal cable extending longitudinally between the inboard and outboard shielded cables and electrically connected at its ends to the central conductors of the inboard and outboard shielded cables;
- a flexible, foraminous, conductive shielding means, through which resinous sealant may be readily passed, radially disposed about and spaced from the signal cable, which shielding means extends longitudinally between and is electrically connected at its ends to the conductive shields of the inboard and outboard shielded cables;
- two spaced apart, electrically insulating, resinous sealant members formed of in situ hardened resinous sealant disposed about the signal cable and filling the spacing between the signal cable and the shielding means, and encompassing the shielding means, with a leak monitoring spacing maintained between the spaced apart sealant members which each form a seal about and along the signal cable and the shielding means.

8. The electrical penetration assembly specified in claim 7, wherein each of the inboard and outboard shielded cables is a triaxial cable, and a second conductive shielding means is provided spaced concentrically about the flexible, foraminous conductive shielding means, and the second conductive shielding means is also a flexible, foraminous conductive means which extends between and is electrically connected to the outermost conductive shields of the triaxial inboard and outboard shielded cables, and the resinous sealant members extend radially outwardly and encompass the second shielding means.

* * * * *